March 19, 1957  A. L. HUBBARD  2,785,524

COTTON PICKER SPINDLE ASSEMBLY

Filed Jan. 3, 1956

*INVENTOR.*
ARTHUR L. HUBBARD

United States Patent Office 2,785,524
Patented Mar. 19, 1957

2,785,524

COTTON PICKER SPINDLE ASSEMBLY

Arthur L. Hubbard, Des Moines, Iowa, assignor to Deere Manufacturing Co., Dubuque, Iowa, a corporation of Iowa Application January 3, 1956, Serial No. 557,023

8 Claims. (Cl. 56—50)

This invention relates to a picking spindle assembly adapted for use with a conventional type cotton picker. More particularly this invention relates to a sealing arrangement incorporated in the assembly which prevents oil leaking externally from the assembly and onto the picked cotton as well as preventing moisture and other forms of matter from entering externally into the bearing surfaces of the assembly.

Due to the high rate of rotation of the spindles used on the modern cotton picker, a high quality bearing is required between the spindle holder and the shank of the spindle which in turn requires a suitable lubricating system. In providing an oil lubricant to the bearings the problem arises as to the proper type of seal necessary in order to prevent the lubricating oil from leaking out of the end of the holder and bearing and into the cotton bolls in the process of being harvested. In the past there have been several types of seals used, all of which have met with limited success.

It is, therefore, the primary object of this invention to provide a type of seal between the spindle and the spindle holder which will afford maximum sealing protection.

It is also an object of this invention to provide a seal which is cheaply produced, easily replaceable, and which may be installed without use of special tools and without dismantling the assembly.

It is still a further object of this invention to provide a spindle assembly having a seal of elastic material which affords suitable protection for the seal to prevent moisture, dirt and other foreign matter from entering under the seal.

Other objects and advantages of the invention will become apparent to those skilled in the art as the nature of the invention is better understood from the following disclosure and the accompanying drawings.

Figure 1:
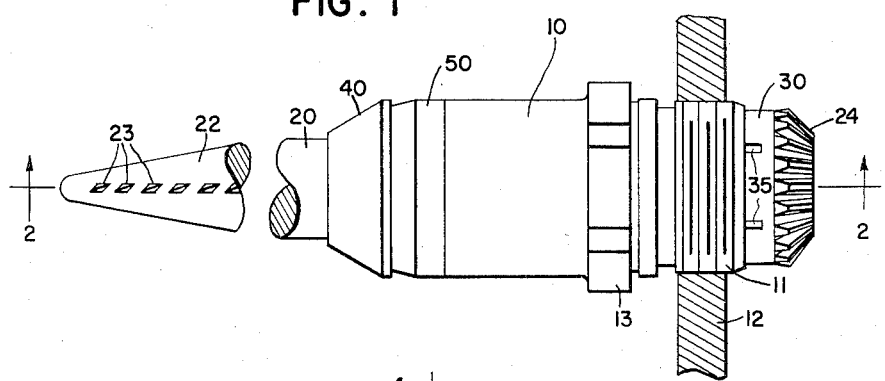
Fig. 1 is a fragmentary plan view of the spindle assembly and a portion of the supporting frame.
Figure 2:
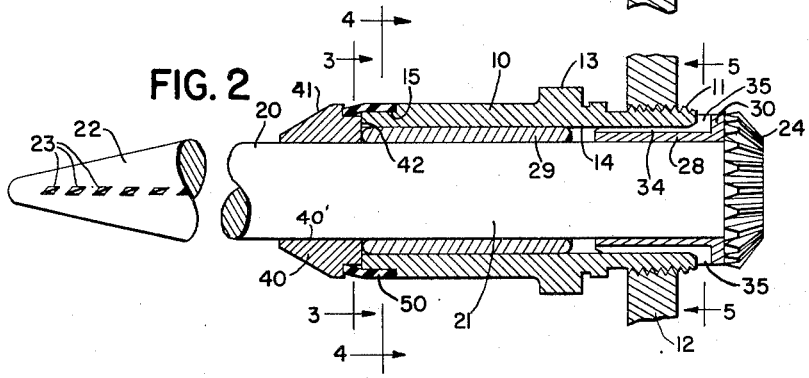
Fig. 2 is an elevational view similar to Figure 1, but with parts shown in section along line 2—2 of Fig. 1.
Figure 3:
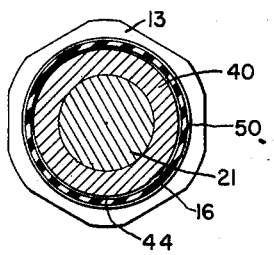
Fig. 3 is a sectional view taken along the lines 3—3 of Fig. 2.
Figure 4:
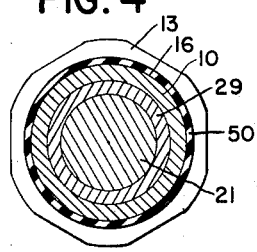
Fig. 4 is a sectional view taken along the lines 4—4 of Fig. 2.
Figure 5:
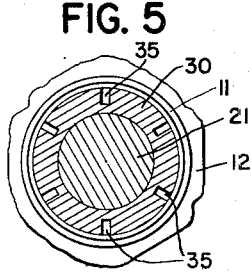
Fig. 5 is a sectional view taken along the lines 5—5 of Fig. 2.

The spindle assembly is composed of a spindle holder 10 or nut which is threaded, as at 11, at one end for mounting in a tapped opening of a spindle bar or wall 12. The holder 10 is provided with a hexagonal portion 13 on which a wrench or other instrument may be placed to tighten or loosen the holder in the bar or wall 12. The holder 10 is provided with an inner surface 14 which is cylindrical. The end of the holder 10 opposite to the threaded end 11 is provided with an annular recess 15 on its outer periphery to form an outer cylindrical surface 16 extending axially from the end of the holder and a radial surface 17 spaced axially from the end of the holder 10. A cotton picker spindle 20 comprises a shank portion 21 positioned internally of the holder 10 and an outer cotton-picking portion 22 extending axially outwardly of the holder 10. The portion 22 is provided with conventional type barbs 23, the purpose of which is obvious. The inner end of the shank portion 21 is provided with a bevel gear 24 which normally meshes with a bevel pinion, not shown, to drive the spindle at a relatively high rate of rotation.

Each spindle is journaled by means of the cylindrical bearing surface on its shank portion 21 on bushing or bearing means preferably comprising an inner part 28 and an outer part 29. In the present instance, the bushing 28 is in the form of a tube or spacer having an exterior surface and an interior surface, both of which are cylindrical, the outer surface of which forms a mounting surface for the mounting of the bushing in fixed relation to the holder 10. The interior surface of the bushing 28 is a bearing surface adjacent to the shank 21 of the spindle 20. The bushing 28 is provided with a radial flange 30 which is positioned inwardly of the spindle drum wall 12. The flange 30 is positioned between the inner end of the holder 10 and the bevel gear 24 to provide a thrust bearing surface with the bevel gear 24. The bushing 28 is also provided with axially extending slots 34 extending the length of the bushing and opening into the inner portions, as at 35, of the spindle drum. The slots are provided to permit oil or other types of lubricant to be transferred from suitable sources inwardly of the spindle drum 12 to the bearing surfaces of the bushings 28, 29. Details of a lubricating feeding means is not herein provided, but should a more detailed description be desired such is available in the U. S. Patent 2,595,601.

The outer bushing 29 is provided with inner and outer cylindrical surfaces, the outer cylindrical surface serving to mount the bushing in a fixed relation to the holder 10 and the inner surface providing a bearing surface adjacent to the shank 21 of the spindle 20. The bushing 29 is spaced axially from the end of the bushing 28 to provide a pocket for receiving oil or other such lubricant from the slots 34, there to be distributed axially along the outer surface of the shank portion 21. The outer end of the bushing 29 extends to a position in radial alinement with the end of the holder 10.

Figure 6:
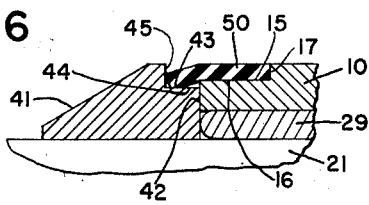
Fig. 6 is an enlarged sectional view showing a cross section of the seal assembly.

A cap or guard 40 is fixed to the spindle 20. In the present instance the cap is in the form of a rigid annular member swedged to the outer surface of the spindle in order to insure a tight oil seal between the inner surface 40' of the cap and the outer surface of the spindle. It should, however, be recognized that there are other means of fixing the cap 40 to the spindle 20 which will prevent rotation and which will offer a suitable oil seal. The cap 40 is tapered, as at 41, at its outer end to provide a more even flow of materials over its surface. The inner end 42 of the cap abuts against the outer end of the holder 10. The outer periphery of the cap 40 is provided with an annular recess 43 forming a cylindrical surface 44 extending axially from the end 42 and a radial surface 45 spaced axially from the end 42. As clearly indicated (Fig. 6) the cylindrical surface 45 of the cap 40 is substantially smaller than the cylindrical surface 16 of the holder 10.

An annular ring 50 of elastic material, in the present instance rubber, is positioned over the cylindrical surfaces 16 and 44. In its relaxed condition the rubber ring 50 is of cylindrical shape and is substantially smaller than the periphery of the cylindrical surfaces 44 and 16, thereby necessitating stretching of the ring to fit over the surfaces. Axially the elastic ring 50 is of such length as to extend between the radial surfaces 17 and 45 with the edges of the ring abutting those surfaces.

In operation the spindle 20 and cap 40 is rotated while the spindle holder 10 is fixed against rotation. Due to the elastic qualities of the rubber ring a greater pressure will be exerted upon the larger cylindrical surface 16 than on the smaller surface 44. Therefore, the elastic ring 50 will be held against rotation relative to the surface 44 and relative rotation will be created between the surface 44 and the inner surface of the elastic material 50 upon rotation of the spindle 20. However, the inner surface of the ring 50 will nevertheless provide a sealing contact with the surface 44 of the cap. The radially extending surfaces 17 and 45 adjacent to the edges of the elastic ring will prevent cotton fibers, dirt, and other foreign matter from entering beneath the sealing ring and thus serve as guards protecting the elastic ring. Should the ring be destroyed, or become worn, replacement may be made by cutting the then existing seal off of the assembly and replacing it by moving a replacement seal axially along the spindle and over the tapered end 41 of the cap to be seated in the recesses 15 and 43.

While only one form of the invention has been shown, it should be recognized that other forms and variations could exist without departing basically from the broad general principles herein disclosed. It should, therefore, be understood that while the preferred embodiment of the invention has been described with the view of clearly and concisely illustrating its principle, it is desired not to so limit or narrow the invention beyond that which is claimed.

What is claimed is:

1. A cotton picker spindle assembly comprising: a spindle support having a spindle receiving opening with an inner bearing surface and an outer cylindrical surface at one end thereof; a rotatable spindle having its axis of rotation coincident with that of the bearing surface and having a shank portion journaled in the opening and a picking portion extending axially outwardly from the aforesaid end of the support; a guard member fixedly connected to the spindle and positioned proximate to the end of the support, the guard member having an inner surface adjacent to the spindle to provide a seal therebetween and an outer cylindrical surface, the latter cylindrical surface being unequal in its periphery to said cylindrical surface on the holder; a cylindrical elastic sealing ring mounted over the cylindrical surfaces of the holder and the guard, the elastic qualities of the ring causing the cylindrical surface with the larger periphery to be gripped with the greater pressure thereby resulting in relative rotation between the other surface and the ring upon rotation of the spindle while maintaining sealing contact between the ring and said other surface.

2. The invention defined in claim 1, in which the holder has a radially extending portion extending from its cylindrical surface and the spindle assembly is further characterized by having the edge of the elastic ring abutting said portion.

3. The invention defined in claim 1, in which the guard member has a radially extending portion extending from its cylindrical surface and the spindle assembly is further characterized by having the edge of the elastic ring abutting said portion.

4. The invention defined in claim 1 in which the cylindrical surface of the holder is larger than that of the guard thereby causing the ring to be held against rotation.

5. A cotton picker spindle assembly comprising: a spindle support having a spindle receiving opening with an inner bearing surface; a rotatable spindle having its axis of rotation coincident with that of the bearing surface and having a shank portion journaled in the opening and a picking portion extending axially outwardly from the end of the support; a radially extending guard member fixed to the spindle proximate to the end of the support; an annular elastic seal mounted over the outer surfaces of the holder and the guard, the elastic qualities of the seal causing one of the surfaces to be gripped with greater pressure than the other surface thereby resulting in relative rotation between said other surface and the seal upon rotation of the spindle while maintaining sealing contact between the seal and said other surface.

6. A cotton picker spindle assembly comprising: a spindle support having a spindle receiving opening with an inner bearing surface; a rotatable spindle having its axis of rotation coincident with the bearing surface and having a shank portion journaled in the opening and a picking portion extending axially outwardly from the end of the support; an annular rigid member fixed to the spindle proximate to the end of the support; and an annular elastic seal mounted over the outer peripheral surfaces of the holder and the member, the peripheral characteristics of one of the outer surfaces being such as to cause the seal to grip said one outer surface with greater tenacity than the other outer surface thereby resulting in relative rotation between said other outer surface and the seal upon rotation of the spindle while maintaining a sealing contact between the seal and said other outer surface.

7. A cotton picker spindle assembly comprising: a spindle support having a spindle receiving opening with an inner bearing surface and having an annular recessed step at one end thereof including a radial surface spaced axially from the end; a rotatable spindle having its axis of rotation coincident with the bearing surface and having a shank portion journaled in the opening and a picking portion extending axially outwardly from said end of the support; an annular rigid member fixed to the spindle proximate to said end of the support, the member having an annular recessed step at the end proximate to the support and including a radial surface spaced axially from the support; and an annular elastic seal mounted over the outer peripheral surfaces of the recesses in the holder and the member and having opposite ends thereof abutting the respective radial surfaces, the peripheral characteristics of one of the outer surfaces being such as to cause the seal to grip said one outer surface with greater tenacity than the other outer surface thereby resulting in relative rotation between said other outer surface and the seal upon rotation of the spindle while maintaining a sealing contact between the seal and said other outer surface.

8. A support having an opening with an inner bearing surface, an outer cylindrical surface at one end thereof, and a radial surface extending from the outer cylindrical surface; a rotatable member having its axis of rotation coincident with that of the bearing surface and having a shank portion journaled therein; an annular rigid member fixed to the rotatable member proximate to the end of the support, the annular member having an annular recessed step at the end proximate to the support including a cylindrical surface and a radial surface spaced axially from the support, the latter cylindrical surface being unequal in its periphery to that of the support; an elastic and cylindrical shaped sealing ring mounted over the cylindrical surfaces of the holder and the guard and having opposite edges abutting respectively the radial surfaces on the support and annular rigid member, the elastic qualities of the ring causing the cylindrical surface with the larger periphery to be gripped with greater pressure than the other cylindrical surface thereby resulting in relative rotation between said other surface and the ring upon rotation of the rotatable member while maintaining a sealing contact between said other cylindrical surface and the elastic ring.

No references cited.